United States Patent

[11] 3,617,012

[72] Inventor Daniel J. Stark
Rochester, N.Y.
[21] Appl. No. 24,076
[22] Filed Mar. 31, 1970
[45] Patented Nov. 2, 1971
[73] Assignee Eastman Kodak Company
Rochester, N.Y.

[54] INTERLOCK MECHANISM FOR CARTRIDGE-LOADING MOTION PICTURE PROJECTOR OR THE LIKE
4 Claims, 5 Drawing Figs.

[52] U.S. Cl. .................................................. 242/192,
242/197, 242/205, 352/158
[51] Int. Cl. ........................................................ G03b 1/04,
G11b 15/32
[50] Field of Search ........................................ 242/186,
187, 192, 195, 197, 198; 352/157, 158

[56] References Cited
UNITED STATES PATENTS
3,489,370  1/1970  Mouissie ......................  242/198
3,531,192  9/1970  Etter .............................  242/192 X
3,558,028  1/1971  Bunting ........................  352/158 X Primary Examiner—Stanley N. Gilreath
Assistant Examiner—Werner H. Schroeder
Attorneys—Robert W. Hampton and G. Herman Childress ABSTRACT: A cartridge-loading motion picture projector has a film supply spindle mounted on an arm that is movable to each of a plurality of positions wherein the spindle is engageable with a core of a film reel positioned within a cartridge on the projector, and the arm and spindle are movable to at least one additional position wherein the spindle is adapted to support an unenclosed reel of film or the like. The projector comprises a film-feeding mechanism that is at least partially movable into each of several sizes of cartridges that may be mounted on the projector for engaging a roll of film within the cartridge and for feeding said film from the cartridge to automatic threading devices of the projector. An interlock mechanism is provided for blocking normal operation of the film-feeding mechanism when the spindle and arm supporting it are moved to the reel-supporting position.

DANIEL J. STARK
INVENTOR.

ATTORNEYS

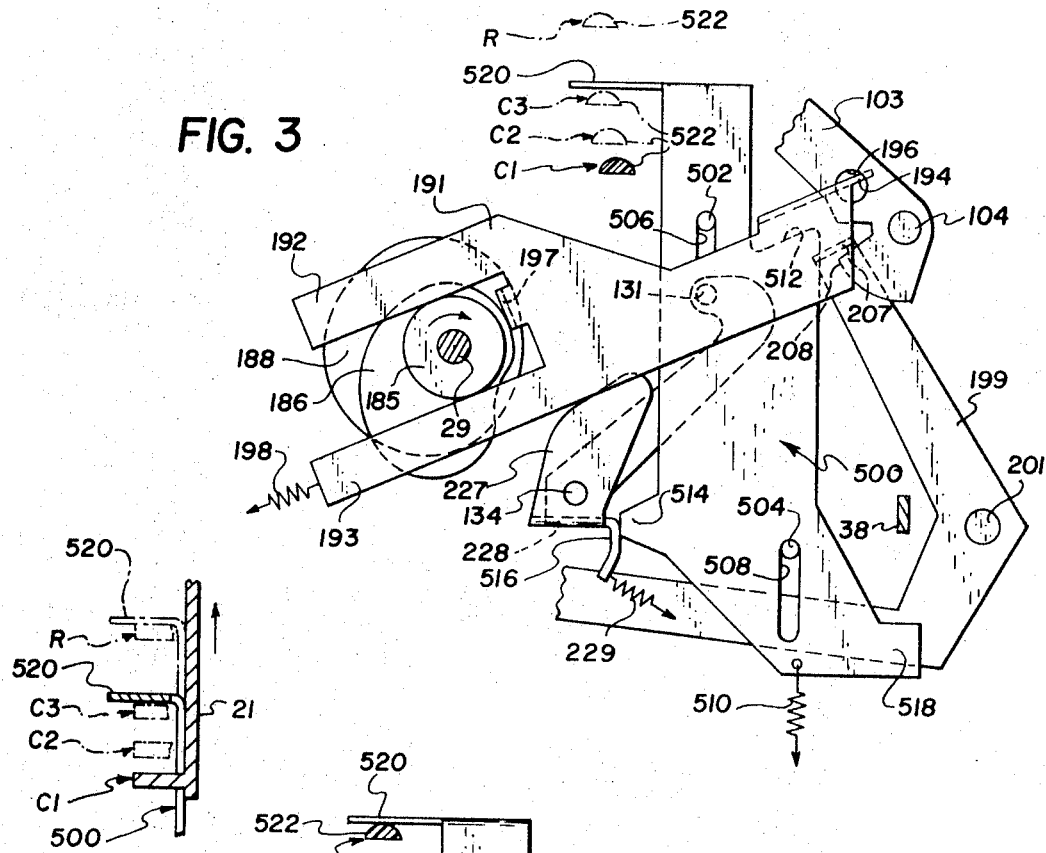
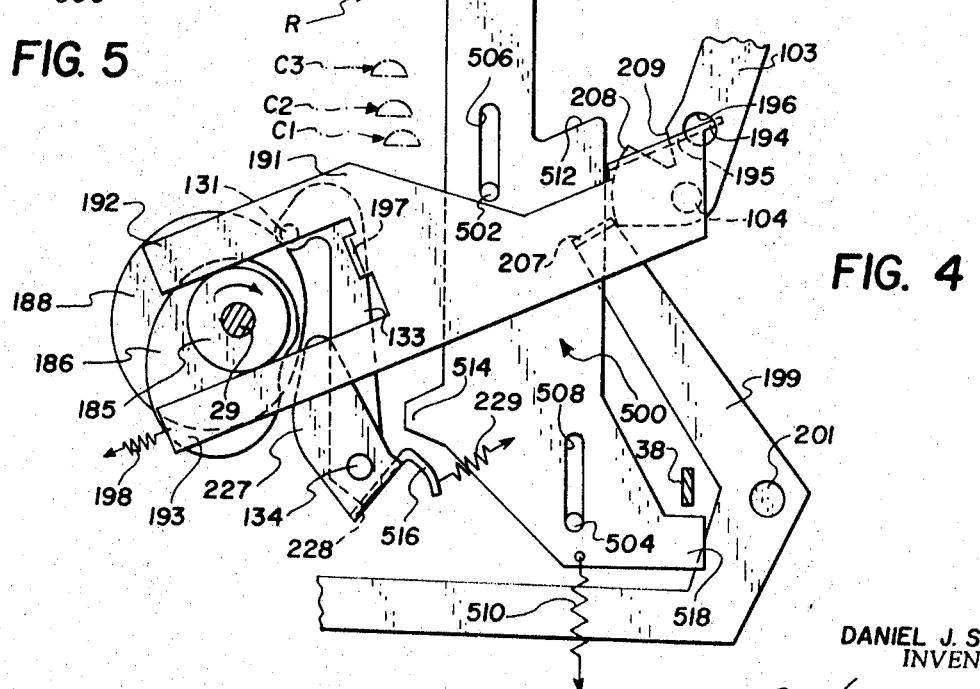

3,617,012

INTERLOCK MECHANISM FOR CARTRIDGE-LOADING MOTION PICTURE PROJECTOR OR THE LIKE

CROSS-REFERENCE TO RELATED APPLICATION

Reference is made to commonly assigned copending U.S. Pat. application Ser. No. 685,616, entitled CINEMATOGRAPHIC PROJECTORS OR THE LIKE AND CARTRIDGES FOR USE THEREWITH, filed in the name of John J. Bundschuh et al. on Nov. 24, 1967, now U.S. Pat. No. 3,552,683.

BACKGROUND OF THE INVENTION

1. Field of the Invention

This invention relates to cartridge-loading motion picture projectors and, more specifically, to such projectors that have a film supply spindle that is adapted to be moved to each of several positions for supporting either reels of film within cartridges or unenclosed film reels.

2. Description of the Prior Art

In the beforementioned copending U.S. Pat. application Ser. No. 685,616 and in the commonly assigned U.S. Pat. No. 3,468,498 to L. J. Bunting, a motion picture projector is disclosed wherein a supply spindle is mounted on an arm for movement between a single lowered position and a single raised or elevated position. When the spindle is in its lower position it is adapted to be received in the core of a film reel located within a cartridge when the cartridge is mounted on a motion picture projector or the like, and a film-feeding mechanism on the projector is operable to move through an opening in the cartridge into engagement with film on the reel for extracting the film from the cartridge and delivering the film to automatic threading devices of the projector. When the spindle is moved to its raised or elevated position it is adapted to receive unenclosed film reels, and an interlock mechanism is provided for blocking normal operation of the film-feeding mechanisms when the arm is raised to the reel-receiving position. The projector described in such application and said patent has proved quite satisfactory in operation; however, the projector is designed for handling only film cartridges that contain relatively small size reels, that is, reels having film capacities of approximately 50 to 100 feet of film. These cartridge sizes, have a common spindle position. While the cartridge-locating structure on that projector might be easily adapted for locating cartridges of larger capacities (such as cartridges for reels having film capacities of 200 to 400 feet of film), the larger size cartridges have openings for receiving spindles which are positioned with respect to locating structures on the cartridges so that movement of the spindle would be required from its lowered position to an elevated position when larger size cartridges are used and, as previously indicated, in that projector this movement results in blocking of the film-feeding mechanism used for extracting film from the cartridge. Accordingly, that projector cannot be used for projecting film in larger size cartridges. However, it is desirable to provide a cartridge-loading projector that can handle film on unenclosed film feels as well as film in both small and large size cartridges.

SUMMARY OF THE INVENTION

Accordingly, it is an object of this invention to provide an improved cartridge-loading motion picture projector wherein a supply spindle engageable with film reels within cartridges of various sizes can be moved to various operating positions for the cartridges without disabling the film-feeding mechanism. Another object of the invention is to provide an interlock mechanism wherein a spindle is movable to each of several positions without blocking of the film-feeding mechanism, and the spindle is movable to an additional position wherein the interlock mechanism blocks operation of the film-feeding mechanism.

In accordance with the present invention an interlock member is provided that is capable of blocking movement of a film-feeding mechanism from its retracted position toward its position wherein it is engageable with a film roll in a cartridge or the like. Means are provided for shifting said interlock mechanism to its position for blocking the film-feeding mechanism only when a supply spindle of a projector is moved to a position wherein it is adapted to receive an unenclosed film reel, and further means are provided for urging the interlock mechanism away from such blocking position during movement of the spindle to and between each of several positions wherein the supply spindle is adapted to engage a film reel within a cartridge.

BRIEF DESCRIPTION OF THE DRAWING

In the detailed description of the preferred embodiments of the invention presented below, reference is made to the accompanying drawings, in which:

FIGS. 2 and 3 are fragmentary elevation views of the interlock mechanism of this invention as viewed from the inside the projector, and showing the interlock mechanism in a position that permits movement of the film-feeding mechanism for the position illustrated in FIG. 2 to the position illustrated in FIG. 3;

FIG. 4 is a view similar to FIGS. 2 and 3 but illustrating the interlock mechanism in a second position wherein the film-feeding mechanism is blocked from movement from the position illustrated in FIG. 2; and FIG. 5 is a fragmentary section taken along line 5—5 of FIG. 2.

DESCRIPTION OF THE PREFERRED EMBODIMENT

Figure 1:
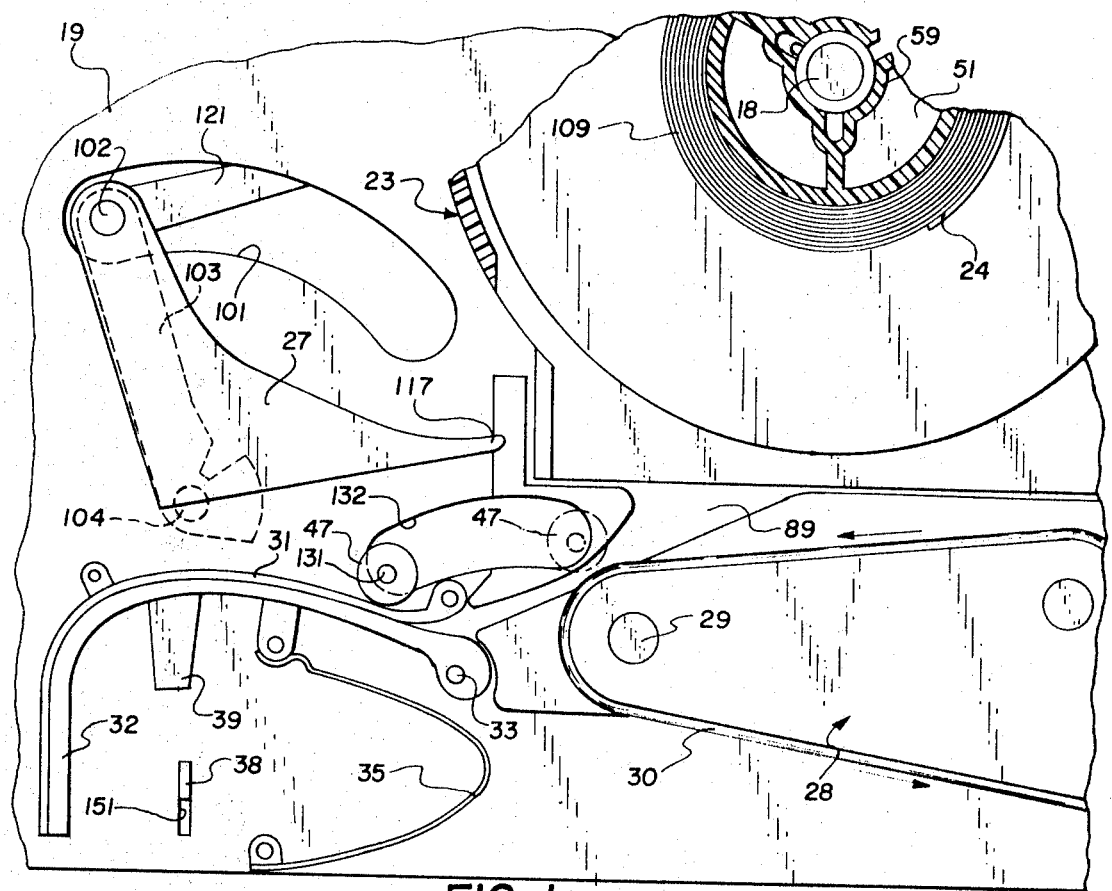
FIG. 1 is a fragmentary elevation view, partially broken away, showing portions of a cartridge-loading motion picture projector of this invention as viewed from outside the projector, and illustrating a portion of a cartridge located on the projector.

Because motion picture projectors are well known, the present description will be directed in particular elements forming part of, or cooperating more directly with, the present invention, projector elements not specifically shown or described herein being understood to be selectable from those known in the art.

As previously indicated, the present invention relates to certain modifications and improvements to projector mechanisms of the type disclosed in the beforementioned copending application Ser. No. 685,616 and the U.S. Pat. No. 3,468,498 to Bunting. Accordingly, the complete disclosures in such application and patent are incorporated herein by this reference. FIGS. 1–4 correspond generally to FIGS. 8 and 13–15, respectively, of such application and patent; however, certain portions of the disclosure in such application and patent have been omitted from FIGS. 1–4 for the purpose of clarity, and certain changes and additions have been made to illustrate features of the present invention. Before proceeding with the detailed description of the modifications and improvements comprising the present invention, a brief description will be made of portions of the earlier projector disclosed in FIGS. 1–4, reference being made to the beforementioned application and patent for a more complete description of the prior mechanisms. To the extent practical, the reference numerals used in the description immediately following are the same as used in said application and patent for describing the same or similar parts of the projector.

Referring now to the drawings, a supply spindle 18 projects through a mechanism plate 19 of a motion picture projector and such spindle is adapted to project into and support the hub 59 of a film reel spool 51. Motion picture film 24 (or other suitable web material) is wound into a roll 109 on hub 59. The film roll is positioned within a cartridge 23 that can be mounted on mechanism plate 19. Spindle 18 is carried by an arm 21 (FIG. 2) that is mounted for pivotal movement about the axis of a shaft 22. As described in more detail later, the spindle is adapted to receive an unenclosed film reel (i.e., a reel not enclosed within a cartridge) when the arm is in one of its raised positions. At this point in the description it should be noted that in the projector described in the previously mentioned application and patent the spindle 18 moved to only two positions, that is, a cartridge or lowered position and a reel or raised position, whereas in accordance with the present invention (and as described later) the spindle is movable to each of several positions wherein it is adapted to receive a film reel in a cartridge and to a further (raised) position where it is adapted to receive a film reel.

Proceeding now with the brief description of the projector described in such copending application and said patent, film 24 is extracted from cartridge 23 and delivered to automatic threading devices of the projector by means of a stripping mechanism comprising a stripping finger 27 and a stripper belt member or drive means 28. The stripper member 27 is mounted on a pin 102 that is moved by a stripper arm 103, the latter being movable about a pivot or stud 104. Pin 102 moves through a curved slot 101 in plate 19, and movement of the stripper finger is under control of a cam follower arm 121 attached to pin 102. Stripper belt member 28 comprises a belt 30 trained around three pulleys (not shown) one of which is mounted on a drive shaft 29 that is continuously rotated during operation of the projector so that the belt 30 is continuously driven in the direction shown by the arrow. The entire belt member 28 is movable counterclockwise about the axis of shaft 29 from the position shown in FIG. 1 through an opening in the bottom of the cartridge 23 and into engagement with the film roll within the cartridge for driving such roll in an unwinding direction, thereby to move the leading end of the film into engagement with a tooth 117 on an end of the stripping finger. The stripping finger then deflects the leading end of the film away from the roll 109 and the film travels along a guide path between the stripping finger and the belt 30 and is delivered into a film guide channel 89 on plate 19. The film is then delivered from that guide channel into the space between a stationary film guide member 31 on plate 19 and a snubber member 32 that is pivotal about pin 33 in response to variations in film tension. The snubber member is biased toward guide member 31 by a spring 35. Film leaving the space between guide member 31 and snubber member 32 is provided to other portions of the projector, including the film gate area of the projector. The film may be secured to the hub 59 of the film reel so that automatic actuation of the rewind mechanism of the projector can be obtained in response to an increase of the film tension at the end of the projection cycle. For this purpose, a shoe member 39 is provided on snubber member 32. This shoe member is movable downwardly into engagement with a trigger lever 38 when the film claw (not shown) at the gate of the projector pulls downwardly on the film after no additional film can be unwound from the reel. Trigger lever 38 is movable downwardly in a slot 151 by shoe 39 to actuate the automatic rewind mechanism of the projector.

When the spindle 18 is raised to its position for receiving an unenclosed film reel, the film-feeding mechanism comprising stripper finger 27 and stripper belt member 28 is blocked from movement into the cartridge and simultaneously a guide roller 47 mounted on a shaft 131 is swung from the solid line position in FIG. 1 to the position shown in dotted lines to bring the guide roller into close proximity to the periphery of belt 30 adjacent to the drive pulley for the belt. As this occurs, the shaft 131 moves through a slot 132 in plate 19. The projector is then threaded manually by taking the leading end of the film from the unenclosed film reel and inserting it into the nip formed by the drive belt and roller 47. Film threading then proceeds in the manner described hereinbefore.

Figure 2:
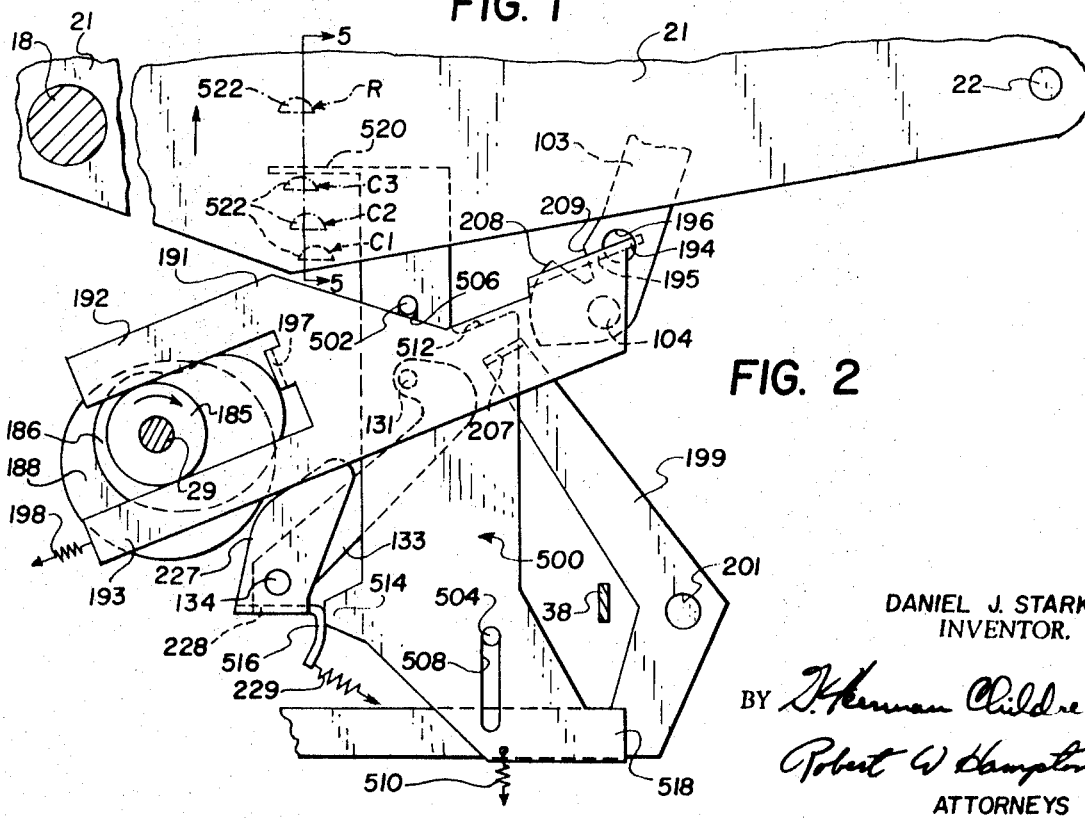

As shown in FIGS. 2-4, shaft 131 carrying guide roller 47 is attached to a roller lever 133 movable about a pivot stud 134. Lever 133 has a cam follower ear 227 that extends upwardly from a connecting member 228 of the lever, and a spring 229 urges ear 227 counterclockwise (as viewed in FIGS. 2-4) about stud 134 and toward engagement with a cam lobe 188 connected to shaft 29. Cam 188 permits movement of the lever 133 for shifting the guide roller 47 into the position shown in dotted lines in FIG. 1; however, shaft 131 and roller 47 do not move from their FIGS. 2 and 3 positions unless the interlock member described hereinafter is positioned with respect to lever 133 for permitting such movement. In other words, guide roller 47 may remain in the position shown in solid lines in FIG. 1 even though the cam 188 rotates with shaft 29 to permit such movement.

A stripper finger cam lobe 186 is secured to shaft 29 for rotation therewith. The operation of the stripper finger 27 is controlled by this cam member through a slide bar 191 having legs 192 and 193 that straddle a cam hub 185. The end of bar 191 opposite from legs 192 and 193 has an L-shaped ear 194 that extends beyond a lip 195 on the bar and is received in an opening or hole 196 in stripper arm 103. Between legs 192 and 193 there is a cam follower ear 197 on the bar that is adapted to engage the periphery of the stripper finger lobe 186. A spring diagrammatically shown at 198 urges the bar toward the left, thereby to urge the bar ear 197 toward the cam lobe. Thus during rotation of shaft 29 the ear 197 is urged toward contact with the periphery of lobe 186 by spring 198, and the slide bar 191 is normally moved generally to the lower left and to the upper right as viewed in FIGS. 2-4 by the forces exerted by the spring and the cam lobe, respectively. As this occurs, the stripper arm 103 is moved from the position shown in FIGS. 2 and 4 to the position shown in FIG. 3 to effect movement of the stripper finger 27 from the position shown in FIG. 1 into the cartridge for engagement with the roll of film. As explained later, if movement of the slide bar 199 is blocked, the cam can rotate from the position shown in FIG. 2 without attendant movement of the slide bar.

Operation of the stripper belt member 28 is controlled by a stripper belt control lever 199 which is pivoted to the mechanism plate 19 by a pivot stud 201. This lever is also moved by operation of a cam (not shown) rotatable with shaft 29. As described in the beforementioned application and patent, such cam on shaft 29 causes pivotal movement of the stripper belt member 28 about the axis of shaft 29. When the cams on shaft 29 are in their initial position (shown in FIG. 2) the slide bar 191 and lever 199 are located in position shown in FIG. 2 by the resilient engagement of their respective cam follower ears and the corresponding cam lobes on shaft 29, thereby maintaining the stripper finger and the stripper belt member in their retracted position as shown in FIG. 1. Upon operation of a manual control member, the cams on shaft 29 are rotated to an intermediate position (shown in FIG. 3) to thus move the slide bar 191 and lever 199 to their respective positions as illustrated in FIG. 3. This moves the stripper finger and the stripper belt member through the opening in the bottom of the cartridge and into engagement with the film roll therein.

During initial stages of rotation of the shaft 29 for movement of the cam lobes, an ear 207 on lever 199 is aligned with the curved edge surface 208 on stripper arm 103 to prevent movement of the stripper belt member 28. However, as arm 103 rotates toward its FIG. 3 position, a notch 209 on arm 103 is brought into alignment with the ear 207 to permit rotation of the lever 199 clockwise about stud 201 to the position shown in FIG. 3. The effect is to delay movement of the stripper belt member 28 into the cartridge until after the stripper finger 27 moves into the cartridge. The parts are returned from the position shown in FIG. 3 to the position shown in FIG. 2 by sensor means (not shown) which senses the presence of the film at a particular point along the film threading path, such being effected in the manner described in the beforementioned copending application and said patent.

The foregoing description of the mechanisms described in FIGS. 1-4 relates primarily to those mechanisms and devices described in the beforementioned copending application and in said patent. Reference will now be made to those portions of FIGS. 2-4 which primarily illustrate the modification and/or improvements comprising the present invention.

As indicated earlier herein, the cartridge projector of this invention is adapted to handle the cartridges of various film capacities, including (inter alia) cartridges containing reels of relatively small lengths of film (such as approximately 50 feet of film or less) and also to handle cartridges containing reels of relatively larger lengths of film (such as approximately 400 feet of film). In order to obtain this versatility, movement of the spindle 18 to each of several positions is desired without otherwise effecting operation of mechanisms used during the cartridge mode of operation, such as the film-stripping mechanism. Also, when the projector is to be used with unenclosed film reels the spindle 18 is moved to a further (raised) position for such reel operation, and then it is desirable that the film-stripping mechanism be disabled or blocked from movement from its retracted position (FIG. 2). For reel-type operation, the leading end of the film is fed manually between the nip formed by the belt 30 and the guide roller 47 when the latter is in the position shown in dotted lines in FIG. 1. Conversion of the projector from one mode of operation to another is achieved by the mechanisms of the invention which will now be described.

A selector slide or interlock mechanism generally designated 500 is supported for vertical sliding movement between a lowered position (FIGS. 2 and 3) and a raised position (FIG. 4) by pins 502 and 504 that project from plate 19 and extend through elongate guide slots 506 and 508, respectively in the slide 500. The slide is biased downwardly (as viewed in the drawings) by a spring diagrammatically shown at 510 in FIGS. 2 and 3. However, the slide 500 is movable upwardly against the biasing force of spring 510 by a distance equal to the length of the guide slots 506 and 508. Slide 500 has a notch 512 along its right edge that is adapted to receive the lip 195 of slide bar 191 when the selector slide 500 is in the lower position as shown in FIGS. 2 and 3. However, as shown in FIG. 4, when the selector slide is raised, the notch 512 is above the path of movement of lip 195, thereby preventing movement of the slide bar 191 to the left and thereby blocking movement of the film-feeding mechanism into the cartridge. This, of course, does not prevent rotation of the shaft 29 or rotation of the cam lobes 186 and 188 since the slide bar 199 is simply biased toward the left into engagement with the associated cam lobe. Since lever 103 cannot rotate about stud 104, the lever 199 controlling movement of the stripper belt member 28 also cannot move. Thus both portions of the film-feeding mechanism are blocked from movement into the cartridge in response to upward movement of the selector slide 500.

Slide 500 has a projecting ear 514 along its lower left side. A lip member or flange portion 516 projecting from the base member 228 is biased by spring 229 against ear 514 when the slide member is in its lower position. Thus ear 514 prevents rotation of the arm 133 about its stud 134 to move the shaft 131 and thus the roller 47 from the position shown in solid lines to the position shown in dotted lines in FIG. 1. However, when the slide 500 is moved to its raised position (FIG. 4), the ear 514 is removed from its blocking relation with respect to member 516, thereby permitting movement of the lever arm 133 by the spring 229 during rotation of the associated cam lobe 188.

Preferably, slide 500 is provided with means for preventing operation of the automatic rewind device of the projector when the slide is moved to its raised position (i.e., the position it assumes when the projector is in the reel mode of operation). This function is preformed by providing an ear 518 on the lower right side of the slide and positioning such ear on the slide so that when the slide is moved to its raised position (FIG. 4) the ear is immediately beneath the trigger lever 38 of the automatic rewind device so that the lever 38 cannot be depressed for initiating automatic rewind while the slide member is in such raised position. As illustrated in FIGS. 2 and 3, ear 518 is spaced sufficiently from lever 38 when the slide is in its lowermost position so that the lever 38 is free to move downwardly for initiating automatic rewind.

Preferably the slide 500 is moved to its raised position automatically by means of a lost motion type of connection between the slide and the arm so that the slide is raised in response to movement of the arm 21 from the last of several positions of the arm wherein cartridge operation is desired to the position wherein reel-type operation is desired. This lost motion coupling of the arm to the slide member is effected by providing a lip or flange 520 at the upper end of the slide member that projects laterally to a position closely adjacent to the inner surface of the arm 21. A finger 522 secured to the inner surface of the arm 21 is positioned so that it is engageable with the lip 520; however, finger 522 is positioned on the arm so that is does not engage lip 520 during movement of the arm 21 throughout the extent of the movement of the arm for adjusting the spindle 18 to each of the positions wherein the spindle is to be engaged with a reel within a cartridge. Thus for each of the three different positions for the finger 522 designated C1, C2 and C3 in FIGS. 2–5, wherein cartridge-type operation is desired, the finger does not effect movement of the slide 500. However, when the finger moves from the third (C3) cartridge position to its uppermost or reel position (R) as shown in FIG. 4, the finger becomes coupled to the lip to effect upward movement of the slide with the arm for converting the projector to the reel mode of operation by (1) blocking movement of the film-feeding mechanism from its retracted position, (2) freeing lever 133 for movement so that roller 47 can move to its dotted line position in FIG. 1, and (3) blocking downward movement of lever 38 to prevent automatic rewinding of film onto the supply reel in response to an increase in film tension. When arm 21 is lowered to move finger 522 to any of its positions designated C1, C2 or C3, the slide is returned automatically to its lowered position by spring 510.

Thus it will be seen that the interlock mechanism of the invention provides for normal operation of the film-feeding mechanisms and automatic rewind mechanisms during cartridge mode of operation for each of several sizes of cartridges and when the spindle is in each of several positions, and that the projector is automatically converted for reel-type operation by movement of the interlock means of the invention to its raised position in response to movement of the spindle to the reel position by automatically blocking movement of the film-feeding mechanism from normal position outside the cartridge (as shown in FIG. 1) and for preventing initiation of automatic rewind by depressing lever 38 in response to an increase in film tension. While the mechanism of the invention has been described in connection with a projector that is adapted to have the spindle moved to three positions wherein cartridge-type operation is desired and a fourth position where a reel-type operation is desired, it will be understood that the mechanism described is equally suitable for projectors requiring only one position each for cartridge and reel-type operation, or for other numbers of positions for cartridge and/or reel operations.

The invention has been described in detail with particular reference to preferred embodiments thereof, but it will be understood that variations and modifications can be effected within the spirit and scope of the invention.

I claim:

1. In a cartridge-loading motion picture projector adapted to receive and mount at least two sizes of cartridges containing film reels, the cartridge having openings therein for receiving a reel-engaging spindle, the spindle having a different position for each cartridge size, the combination comprising:

an arm supporting said spindle and mounted on the projector for movement between each of at least three positions, whereby the spindle is engageable with a film reel within a cartridge of one size when the arm is in one of said positions, engageable with a film reel within a cartridge of a second size when the arm is in a second of said positions and engageable with an unenclosed film reel when the arm is in a third of said positions, a film-feeding mechanism on the projector adapted to move from a retracted position outside of a cartridge mounted on the projector to a second position at least partially inside the cartridge for engaging a film roll on a film reel within the cartridge to feed film from the cartridge, an interlock mechanism carried by the projector and mounted for movement between a first position and a second position, said interlock mechanism when in its first position being located with respect to said film-feeding mechanism to permit unobstructed movement of the film-feeding mechanism from such retracted position to its second position and back to its retracted position, said interlock mechanism when in its second position having portions thereof positioned with respect to said film-feeding mechanism for blocking movement of said film-feeding mechanism from its retracted position into its second position, lost motion coupling means operatively connected to said arm and to said interlock mechanism for effecting movement of said interlock mechanism from its first position to its second position in response to movement of said arm and said spindle from either of said two positions wherein the spindle is to be engaged with a film reel in a cartridge to their third position wherein the spindle is to be engaged with an unenclosed film reel, and means for returning said interlock mechanism to its first position from its second position in response to movement of said spindle and said arm from their respective third positions to either of their respective first or second positions.

2. A motion picture projector as set forth in claim 1 wherein said lost motion coupling means comprises a lip on said interlock mechanism and a finger projecting from said arm, said finger being positioned with respect to said lip so that movement of said arm from either of its first and second positions to its third position results in engagement between the finger and the lip and resulting movement of the interlock mechanism from its first position to its second position, and said finger being positioned on said arm with respect to said lip so that said arm is movable between each of said first and second positions for handling film in cartridges without said finger and lip cooperating to effect movement of the interlock mechanism.

3. A motion picture projector as set forth in claim 1 wherein said means for returning said interlock system from said second position to said first position comprises a spring secured to said interlock mechanism and biasing said mechanism toward its first position.

4. A motion picture projector as set forth in claim 1 wherein the projector further comprises a guide roller, means mounting said roller for movement between a first position wherein the roller is spaced from said film-feeding mechanism and a second position wherein said roller is adjacent to a portion of said film-feeding mechanism to define therewith a nip so that an end from a length of film on an unenclosed film reel can be inserted into said nip to effect feeding of film into the projector, the improvement further comprising:

a lip member on said mounting means for said guide roller, and a portion of said interlock mechanism being positioned with respect to said lip member for (1) blocking movement of said roller-mounting means when said interlock member is in its first position and (2) permitting movement of said roller-mounting means when said interlock member is in its second position.